(12) United States Patent
Morliere et al.

(10) Patent No.: US 11,753,958 B2
(45) Date of Patent: Sep. 12, 2023

(54) DEVICE FOR COOLING AN OUTER CASING OF A TURBOMACHINE AND TURBOMACHINE PROVIDED WITH SUCH A DEVICE

(71) Applicant: Safran Aircraft Engines, Paris (FR)

(72) Inventors: Simon Nicolas Morliere, Moissy-Cramayel (FR); Stéphane Pierre Guillaume Blanchard, Moissy-Cramayel (FR); Nicolas Jean-Marc Marcel Beauquin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 20 days.

(21) Appl. No.: 17/633,834

(22) PCT Filed: Aug. 6, 2020

(86) PCT No.: PCT/EP2020/072114
§ 371 (c)(1),
(2) Date: Feb. 8, 2022

(87) PCT Pub. No.: WO2021/028307
PCT Pub. Date: Feb. 18, 2021

(65) Prior Publication Data
US 2022/0228504 A1    Jul. 21, 2022

(30) Foreign Application Priority Data

Aug. 9, 2019  (FR) .................................. FR1909093

(51) Int. Cl.
*F01D 25/12* (2006.01)
*F01D 11/24* (2006.01)
(Continued)

(52) U.S. Cl.
CPC .............. *F01D 11/24* (2013.01); *F01D 25/12* (2013.01); *F01D 25/14* (2013.01); *F01D 25/28* (2013.01);
(Continued)

(58) Field of Classification Search
CPC .......... F01D 11/20; F01D 11/22; F01D 11/24; F01D 25/12; F01D 25/24; F05D 2260/30; F05D 2260/38; F05D 2230/237
See application file for complete search history.

(56) References Cited

U.S. PATENT DOCUMENTS 5,435,124 A    7/1995 Sadil et al.
5,451,116 A    9/1995 Czachor et al.
(Continued)

FOREIGN PATENT DOCUMENTS

JP    52-129805 U    10/1977
JP    2003-172152 A    6/2003
(Continued)

OTHER PUBLICATIONS

International Search Report for PCT/EP2020/072114 dated Oct. 2, 2020.
(Continued)

*Primary Examiner* — David E Sosnowski
*Assistant Examiner* — Maxime M Adjagbe
(74) *Attorney, Agent, or Firm* — Birch, Stewart, Kolasch & Birch, LLP

(57) ABSTRACT

The present invention relates to a device for cooling, using air jets, an external casing of a turbomachine, comprising a housing for supplying air to cooling tubes of said casing, the housing being provided with an attachment device on the external casing. According to the invention, said attachment device comprises two upstream ball joint retention devices which each connect the housing to the external casing.

12 Claims, 10 Drawing Sheets

(51) Int. Cl.
*F01D 25/14* (2006.01)
*F01D 25/28* (2006.01)
*F02C 7/18* (2006.01)

(52) U.S. Cl.
CPC .......... *F02C 7/18* (2013.01); *F05D 2220/323* (2013.01); *F05D 2250/241* (2013.01); *F05D 2260/201* (2013.01); *F05D 2260/30* (2013.01)

(56) References Cited

U.S. PATENT DOCUMENTS

| | | | |
|---|---|---|---|
| 2014/0030066 A1 | 1/2014 | Schimmels et al. | |
| 2015/0345328 A1* | 12/2015 | Prestel | F01D 25/12 415/116 |
| 2016/0003086 A1* | 1/2016 | Day | F01D 11/24 415/136 |
| 2016/0003088 A1* | 1/2016 | Cohin | F16L 53/70 415/178 |
| 2016/0215698 A1 | 7/2016 | Carlson et al. | |
| 2018/0216488 A1* | 8/2018 | Bun | F01D 25/12 |
| 2019/0226357 A1* | 7/2019 | Beauquin | F01D 9/06 |
| 2020/0362725 A1 | 11/2020 | Durand et al. | |

FOREIGN PATENT DOCUMENTS

| | | |
|---|---|---|
| WO | WO 2015/065525 A1 | 5/2015 |
| WO | WO 2019/081861 A1 | 5/2019 |

OTHER PUBLICATIONS

Written Opinion of the International Searching Authority for PCT/EP2020/072114 dated Oct. 2, 2020.

* cited by examiner

DEVICE FOR COOLING AN OUTER CASING OF A TURBOMACHINE AND TURBOMACHINE PROVIDED WITH SUCH A DEVICE

FIELD OF THE INVENTION

The invention lies in the field of aircraft turbomachines.

The present invention relates to a device for cooling, using air jets, an outer casing of a turbomachine, comprising a housing for supplying air and an attachment device for this housing, on this same casing.

The invention also relates to a turbomachine comprising a cooling device using air jets as mentioned previously.

PRIOR ART

One example of a double flow turbomachine, intended to be installed on air aircraft (not shown) to propel it in the air, is shown in the appended FIG. 1.

Conventionally, this turbomachine 1 extends along a main axis 10 and comprises an air intake 11 by which the flow of gas penetrates into the turbomachine 1 and in which the flow of gas passes through a fan 12. Downstream of the fan 12, the gas flow separates into a primary gas flow flowing in a primary stream 13 and a secondary gas flow flowing in a secondary stream 14.

In the primary stream 13, the primary flow passes, from upstream to downstream (i.e. from left to right in the figure), through a low-pressure compressor 131, a high-pressure compressor 132, a combustion chamber 133, a high-pressure turbine 134, a low-pressure turbine 135, and a gas exhaust casing to which is connected an exhaust nozzle 136. In the secondary stream 14, the secondary flow passes through a fan straightener 141 then mixes with the primary stream at the exhaust nozzle.

An inter-stream casing 15 separates the primary stream 13 from the secondary stream 14.

Each compressor or turbine of the turbomachine comprises several states, each stage being formed by fixed blading (or a stator) or even a straightener, and rotating blading (or a rotor) which rotates around the main axis 10 of the turbomachine.

The stator and the rotor of a stage each comprise a plurality of blades distributed regularly around the main axis 10 of the turbomachine and extending radially relative to this axis inside the primary stream, so as to have the primary flow pass through them.

All the stages of a compressor or of a turbine are housed between an inner casing 16 extending around the main axis 10 and the inter-stream casing 15, the latter being provided coaxially around the inner casing 16 so as to delimit the primary stream 13.

The inter-stream casing 15 comprises, from upstream to downstream, an outer low-pressure compressor casing 151, an outer high-pressure compressor casing 152, an outer high-pressure turbine casing 153 and an outer low-pressure turbine casing 154.

The radial clearances between the tip of the blades of a rotor and the outer casing which surrounds it are managed by a cooling device using air jets of this casing.

A part of an outer low-pressure turbine casing 154 can thus be seen in the appended FIG. 2, equipped with a cooling device 2 using air jets. This device 2 comprises at least one supply housing 20 for air under pressure, connected to an air source (for example a part of the secondary air flow) by a connector 21. Each housing 20 is also connected to several cooling tubes 22, (seven in number here for example, on either side of the housing 20). Each tube 22 is curved and disposed around the outer casing 154. In addition, each tube 22 is drilled with a series of air ejection holes (not visible in the figures) opening at right angles (i.e., facing) to the outer face of the outer casing 154.

The cooling device 2 can be of the type known by the acronym "LPTCC" (for "Low Pressure Turbine Clearance Control") or of the type known by the acronym "LPTACC" (for "Low Pressure Turbine Active Clearance Control").

In the case of a cooling device of the LPTCC type, the flow rate of air circulating in the device is directly proportional to the flow rate of air (secondary flow) circulating in the secondary stream.

In the case of a cooling device of the LPTACC type, the flow rate of air circulating in the device 2 is controlled via a motorized valve (not visible in the figures), connected to the computer of the aircraft, which adapts this air flow rate depending on the phases of flight (takeoff, climb, cruise, etc.).

In the cooling devices of the prior art, the housing 20 is attached at its upstream and downstream ends respectively to an upstream flange BAM and to a downstream flange BAV, these two flanges being themselves attached to the two ends of the outer casing 154.

However, in order for cooling using air jets to be effective, it is necessary that the air gap between the tubes 22 and the external face of the outer casing 154 be constant and with a low value. The tubes 22 themselves being attached to the housing 20, it follows that the air gap between this housing 20 and the outer casing 154 must also be constant and with a low value.

However, during the operation of the turbomachine and particularly during the takeoff of the aircraft, it is noted that a high thermal gradient exists between the upstream and downstream flanges that are considered to be "cold," and the outer surface (called the "skin") of the outer casing 154 that is considered to be "hot." Thus the flanges dilate radially less than the rest of the casing 154 and the latter easily takes on the shape of a barrel. Consequently, the air gap between the center of the housing 20 and the casing 154 does not vary in the same way as the air gap between the upstream and downstream ends of the housing 20 and the casing 154.

Moreover, the attachment of the housing 20 to the flanges BAM and BAV imposes a relatively large chain of dimensions of the cooling device 2, which translates into a considerable increase (on the order of several millimeters) of the nominal value of the air gap between the housing 20 and the outer surface of the casing 154 to avoid any risk of contact between them.

Also known from document WO 2015/65 525 is a device for attaching an oil reservoir to the outer casing of the fan of a turbomachine. This device comprises a ball-joint connection, however, this document does not describe the attachment device of the invention.

DISCLOSURE OF THE INVENTION

The invention therefore has as its object to propose an attachment device for an air supply housing, as previously mentioned, to the outer casing of a turbine (high or low pressure) or of a compressor (high or low pressure) of a turbomachine, which avoids the previously mentioned disadvantages of the prior art. An attachment device of this type has as its object of maintaining a relatively constant air gap between the housing and the casing during the flight phase of the aircraft and avoiding contact between the housing and the casing during the transitional phases, such as the takeoff of the aircraft, during which the casing dilates further.

To this end, the invention relates to a cooling device using air jets for an outer turbomachine casing, this cooling device comprising an air supply housing for the cooling tubes of this casing, said housing comprising an upstream end and a downstream end, upstream and downstream being defined relative to the flow direction of the flow in said turbomachine.

According to the invention, said housing comprises an attachment device on said outer casing, in that the attachment device comprises two retention devices using ball-joint connection, called "upstream," configured to connect each the upstream end of the housing to an outer face of the outer casing while allowing the movement of this upstream end relative to the outer face of the outer casing, in that each upstream retention device comprises a cupped washer and a recessed washer, the cupped washer comprising a cupped face received in a concave face of the recessed washer, said cupped washer being able to move relative to said recessed washer to form said ball-joint connection and at least one of the upstream retention devices comprises a lateral flange attached to the housing and a connection assembly attached to the outer casing, the connection assembly comprises a connecting screw attached to a boss and a hollow cylindrical socket, the socket having a part with a large cross section for receiving the head of the screw, this part with a large cross section having, at its outer end, a first shoulder, like a collar, forming a stop for an elastic return member in the radial direction and this part with a large cross section being extended at its inner end by a part with a narrow cross section for receiving the body of the screw, the part with the narrow cross section of the socket is housed both in an opening of the flange of the housing and in a central orifice provided in the cupped washer.

Due to these features of the invention, the housing and the casing can follow the relative movements of one with respect to the other due to differential dilations during operation, which retaining an air gap which varies little between the cooling tubes and the casing, and while avoiding contact between the casing and the housing.

According to other advantageous and nonlimiting features, taken alone or in combination:
  said recessed washer is drilled with a central orifice and has a flat radially inner face and an opposite radially outer face of which the central part is flat and of which the peripheral part is concave, and this recessed washer is arranged so that its flat inner face rests against a flat face of the boss and that the free end of the part with a narrow cross section of the socket rests against the flat central part of the radially outer face of the recessed washer;
  the lateral flange and the cupped washer are in a single piece and the boss and the recessed washer are in a single piece;
  the upstream retention device comprises a cylindrical washer drilled with an orifice, arranged around the connection assembly, against the flange attached to the housing via an elastic return member supported on the first shoulder;
  said socket has on its external surface a third shoulder between its part with a narrow cross section and its part with a large cross section, and this third shoulder forms a stop for limiting the travel of the lateral flange of the housing relative to said casing;
  the opening provided in the flange of the housing has an oblong shape, its largest dimension being oriented circumferentially around the longitudinal axis of the casing;
  said attachment device comprises a retention device using a ball-joint connection, called "downstream," which is configured to connect the downstream end of the housing to the outer casing, while allowing the movement of this downstream end of the housing relative to the casing;
  said downstream retention device comprises a cupped washer and a recessed washer, the cupped washer comprising a cupped face received in a concave face of the recessed washer, said cupped washer being able to move relative to said recessed washer to form the ball-joint connection;
  the downstream retention device comprises a downstream flange attached to the housing and an connection assembly attached to the outer casing and extending through an opening provided in said downstream flange, the connection assembly of the downstream retention device comprises a connecting screw and a hollow cylindrical socket, the socket having a part with a large cross section for receiving the head of the screw, this part with a large cross section having, at its outer end, a first shoulder, like a collar, forming a stop for an elastic return member in the radial direction and this part with a large cross section is extended at its inner end by a part with a narrow cross section for receiving the body of the screw, the part with the narrow cross section of the socket is housed both in the opening of the downstream flange of the housing and in the central orifice of the cupped washer, and a female blocking element is configured to be screwed into the inner end of the screw, against an attachment tab attached to the casing;
  said socket has on its external surface a third shoulder between its part with a narrow cross section and its part with a large cross section and this third shoulder forms a stop for limiting the travel of the downstream flange of the housing relative to the attachment tab attached to said casing;
  the opening provided in the downstream flange of the second retention device has an oblong shape, its largest dimension being oriented along the longitudinal axis of the casing.

Finally, the invention relates to a turbomachine. In conformity with the invention, this turbomachine comprises an outer casing, particularly a turbine or compressor outer casing, and a cooling device using air jets as previously mentioned, said cooling tubes being drilled with air ejection holes and being intended to be arranged around the outer face of said outer casing so that the air ejection holes face the outer face of said outer casing.

DESCRIPTION OF THE FIGURES

Other features, objects and advantages of the invention will be revealed by the description that follows, which is purely illustrative and not limiting, and which must be read with reference to the appended drawings in which.

DETAILED DESCRIPTION OF THE INVENTION

Figure 1:
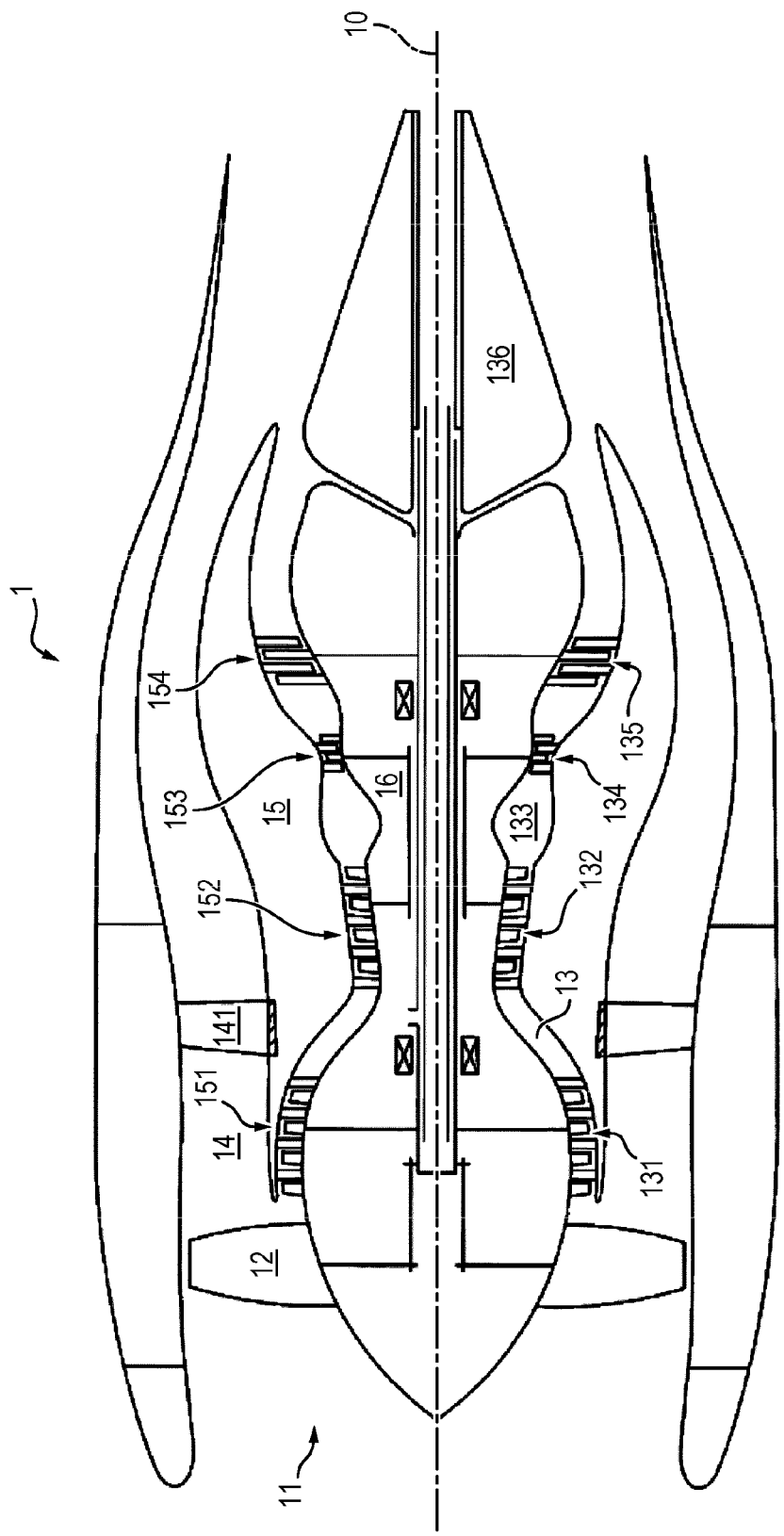
FIG. 1 is a schematic showing an axial section of an example of a turbomachine on which the attachment device of the air supply housing in conformity with the invention can be used.
Figure 2:
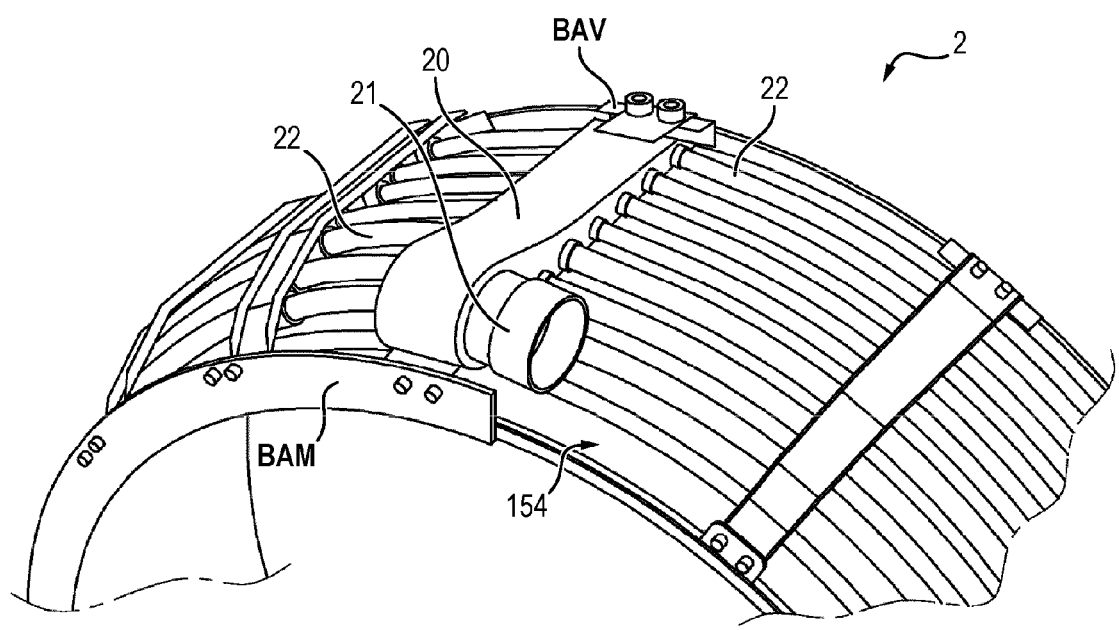
FIG. 2 is a perspective view showing schematically an attachment device of the air supply housing according to the prior art.
Figure 3:
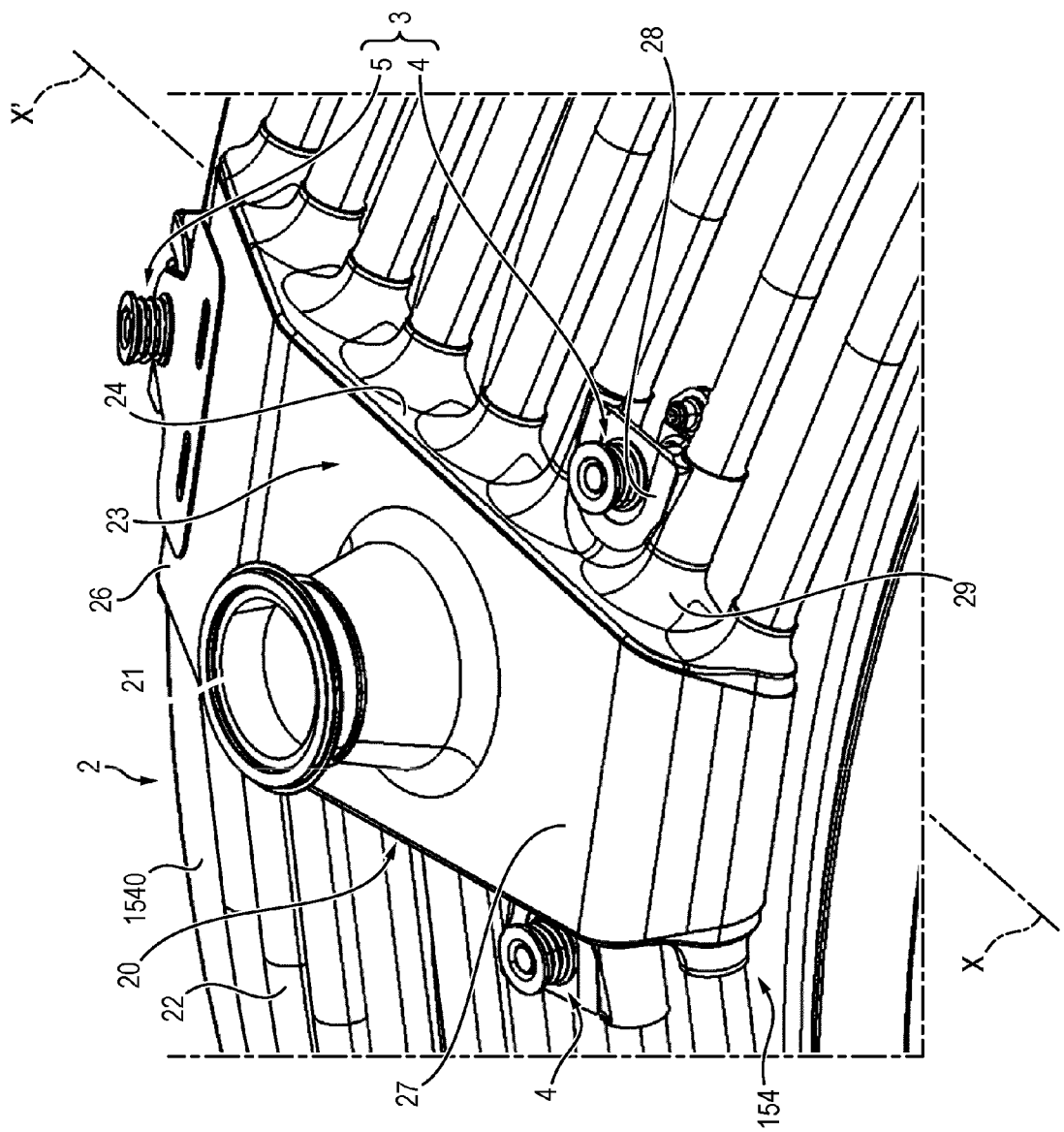
FIG. 3 is a perspective view of the attachment device of an air supply housing according to the invention.

Referring to FIG. 3, it can be seen that the attachment device 3 according to the invention allows attaching an air supply housing 20 to an outer casing 154, by allowing a certain degree of freedom to this housing relative to the casing.

In the example shown in the figures, this outer casing is that of a low-pressure turbine. In conformity with the invention, this casing could be that of a high-pressure turbine or of a high or low-pressure compressor.

A casing 154 of this type has an annular shape, preferably frustoconical or substantially frustoconical. It extends around a main axis X-X' coaxial with the axis 10 when the casing is mounted in the turbomachine. This casing 154 further has, at its downstream end, an annular radial flange 1540.

Figure 4:
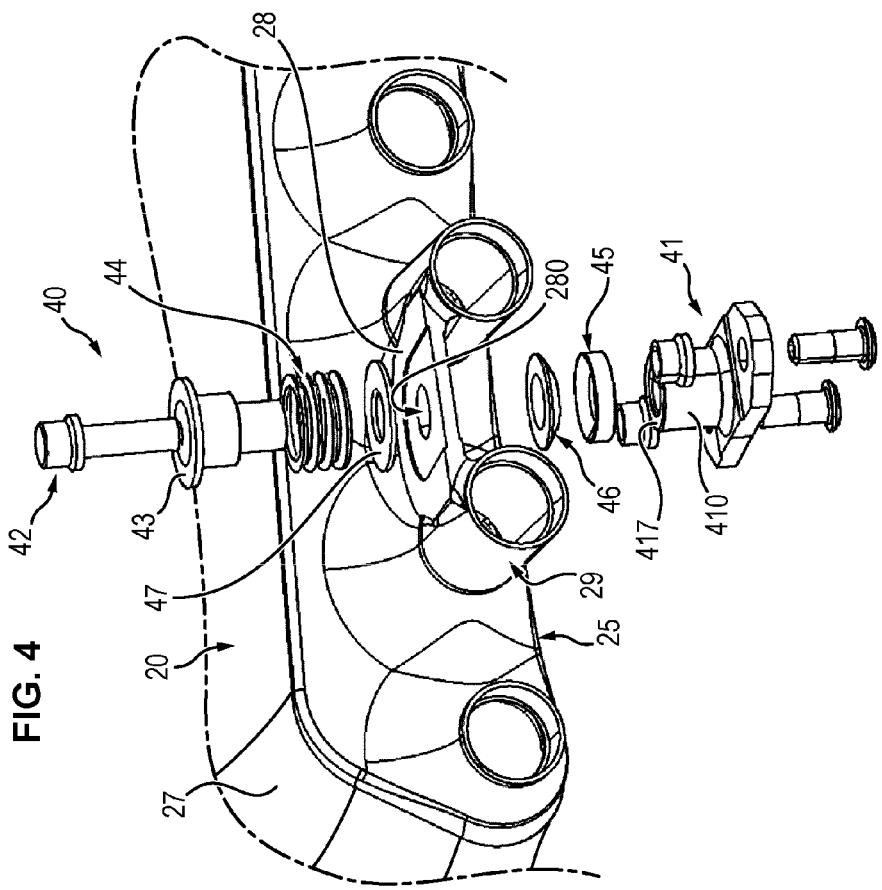
FIG. 4 is an exploded perspective view of a part of the air supply housing and of a first embodiment of one of the two upstream retention devices which form a part of the attachment device according to the invention.

In FIG. 3, it can also be seen that the housing 20 has an outer face 23 to which the connector 21 connects, two opposite lateral faces 24, (only one being visible in the figure) and to which the cooling tubes 22 connect so as to be in air communication with this housing, and an inner face 25 which is more visible in FIG. 4 and which is located facing the outer face of the casing 154.

Finally, this housing 20 has a downstream end 26 and an upstream end 27.

In the description and the claims, the terms "upstream" and "downstream" are defined by reference to the flow direction of the flow, particularly of the primary flow, in the turbomachine.

The shape of the inner face 25 of this housing substantially follows the contour of the outer face of the casing 154.

The attachment device 3 according to the invention comprises at least two (and preferably three) retention devices using ball-joint connection, each of which connect said housing 20 to said outer casing 154.

Still preferably, the attachment device 3 according to the invention comprises two retention device 4 using ball-joint connection, called an "upstream devices," because they are arranged at the upstream end of the housing 20, preferably on either side of the upstream end 27 of the housing.

Preferably, too, the attachment device 3 further comprises a retention device 5 using a ball-joint connection, called a "downstream device" because it connects the downstream end 26 of the housing 20 to the casing 154, more precisely to the downstream flange 1540 of the casing 154.

The upstream retention device 4 using a ball-joint connection will now be described in more detail in connection with FIGS. 3 to 7.

This upstream retention device 4 comprises a lateral flange 28, attached to the housing 20, and a connection assembly 40 attached to the outer face of the outer casing 154. The lateral flange 28 extends in a circumferential direction relative to the casing.

As can be seen in the figures, the lateral flange 28 preferably has the shape of a plate, attached to the housing 20 in proximity to the upstream end 27 of the latter, for example by welding between two adjacent cooling tubes 22 or between two sockets 29 leading out of the housing 20 and which allow the connection of the cooling tubes 22 to this housing.

Still preferably, the upstream retention device 4 is arranged at the zone of the casing 154 that is most deformed.

This lateral flange 28 is drilled with an opening 280, this opening having a cross section allowing the movement of the lateral flange 28 relative to the connection assembly 40 which will be described subsequently.

Figure 5:
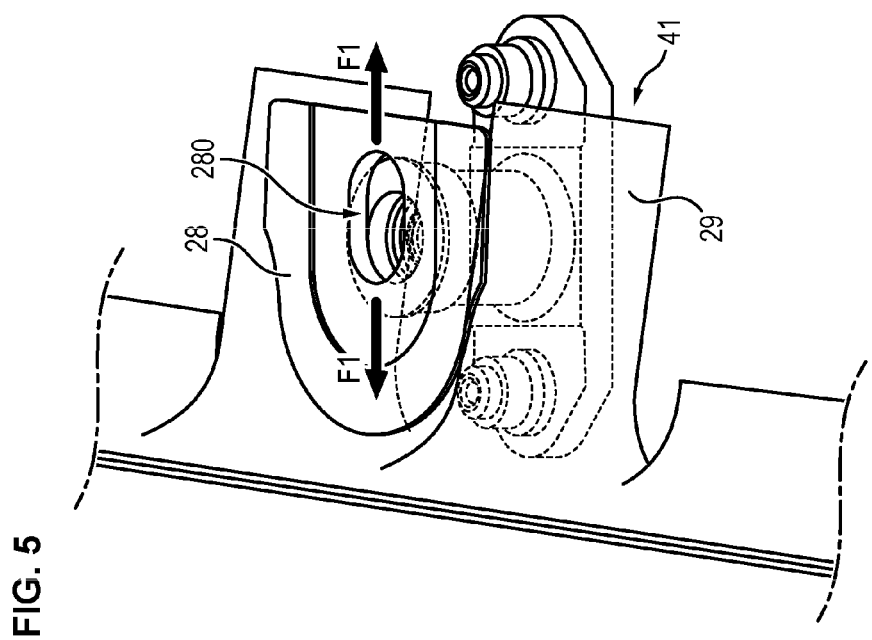
FIG. 5 is a detail perspective view of a part of the housing and of a part of the upstream retention device of FIG. 4.

Still preferably, the opening 280 has an oblong shape, its largest dimension being oriented circumferentially relative to the longitudinal axis XX' of the casing 154 (see FIG. 5).

One possible embodiment of the connection assembly 40 will now be described with reference to FIGS. 4 and 6. This connection assembly 40 extends on either side of the lateral flange 28 while defining, relative to it, an outer part 401, i.e. located outside the flange 28 (toward the top of FIG. 6) and an inner part 402, the latter extending between the lateral flange 28 and the outer surface of the casing 154.

The connection assembly 40 generally comprises a boss 41, a connection pin 42, a socket 43, an elastic return member 44, a recessed (or concave) washer 45, a convex (or cupped) washer 46 and preferably, to limit wear, a cylindrical washer 47.

These various elements will now be described in more detail.

The connection pin 42 extends in a direction Y1-Y'1, called "radial."

The boss 41 comprises a cylindrical part 410, drilled with a bore 411, which is preferably blind and which opens to the radially outer surface of the part 410.

This bore 411 is tapped on its internal surface (tap 412) and extends along the longitudinal axis Y1-Y'1.

The boss 41 can be a single piece with the casing 154, or be welded to it or even, as shown in the figures, be screwed to this casing.

In the latter case and to this end, the cylindrical part 410 is extended for example by at least two attachment tabs 413, arranged on either side of the cylindrical part. Each attachment tab 413 is drilled with an orifice 414. A bolt 415 is inserted through the orifices 414 and the wall of the casing 154 and is retained in place by a nut 416, thus providing the attachment of the boss 41 to the casing 154.

The connection pin 42 is for example a screw comprising a body 420, equipped at one of its ends with a head 421 and which has a thread 423 at its opposite end 422.

The screw 42 cooperates with a female blocking element 424, having a thread 425 on its external surface and a tap 426 on its internal surface.

The socket 43 has the general shape of a cylinder with longitudinal axis Y1-Y'1.

The socket 43 is bordered at one of its ends by a collar 431, which defines a first shoulder the role of which will be explained subsequently. This socket 43 continues inward from the collar 431, by a first part 432 with this large cross section, allowing the passage of the screw 42, including its head 421 and even possibly the passage of an installation or screwing tool for this head 421.

This first part 432 continues with a second part 433 with a narrow cross section, allowing the passage of the body 420 of the connection pin, of the screw here, but prohibiting the passage of the head 421. The free end of the second narrow part 433 carries the reference symbol 434.

The passage between the first part with a large cross section 432 and the second part with a narrow cross section 433 defines a second shoulder 435 toward the inside of the central passage of the socket and a third shoulder 436 toward the outside. The shoulder 435 retains the screw head 421.

According to a variant embodiment not shown in the figures, the socket 43 and the connection pin 42 could form only a single piece.

The elastic return member 44 is for example a helical compression spring. It is arranged around the first part 432 of the socket 43, so that one of its ends is supported against the collar 431 and its other end is supported on the lateral flange 28. It will be noted that it is possible to interleave a cylindrical washer 47 between the lateral flange 28 and the helical spring 44, in order to prevent damage to the lateral flange 28. This cylindrical washer 47, drilled with an orifice 470, is the arranged around the part with the narrow cross section 433 of the socket 43.

The recessed washer 45 is a cylindrical part with a small thickness, drilled with a central orifice 450. It has a radially inner face 451 and an opposite radially outer face of which the central part 452 is flat and of which the peripheral part 453 is concave and curved in a circular arc from this flat part to the periphery of the washer.

This recessed washer 45 is arranged so that its flat inner face 451 rests against the flat radially outer face 417 of the cylindrical part 410 of the boss 41 and that the free end 434 of the socket 43 rests against the flat central face 452 (reference symbol 417 visible only in FIG. 4).

The cupped washer 46 is drilled with a central orifice 460 of larger dimensions than that 450 of the recessed washer 45. It has a flat radially outer face 461 and an opposite convex and cupped (dome shaped) inner face 462. The cupped washer 46 is arranged around the part 433 with a narrow cross section of the socket, so that its flat outer face 461 is in contact with the lateral flange 28 and in particular with its radially inner face 281 and that its convex face 462 is in contact with the concave face 453 of the recessed washer 45.

The assembly of the retaining device 4 is as follows.

The female blocking element 424 is screwed inside the bore 411 of the cylindrical part 410 by the cooperation of its external thread 425 with the tap 412 of the bore.

The socket 43, the return member 44 and the different washers 45, 46 and 47 are positioned as disclosed previously, the narrow part 433 of the socket being inserted into the orifices 470, 280 and 460.

The screw 42 is introduced into the socket 43, as well as through the orifices 470, 280 and 460, then screwed inside the female blocking element 424 by cooperation of its thread 423 with the tap 426 of the nut. This screwing continues until the screw head 421 comes into abutment against the shoulder 435 and the end 434 of the socket 43 comes into abutment against the recessed washer 45.

Figure 6:
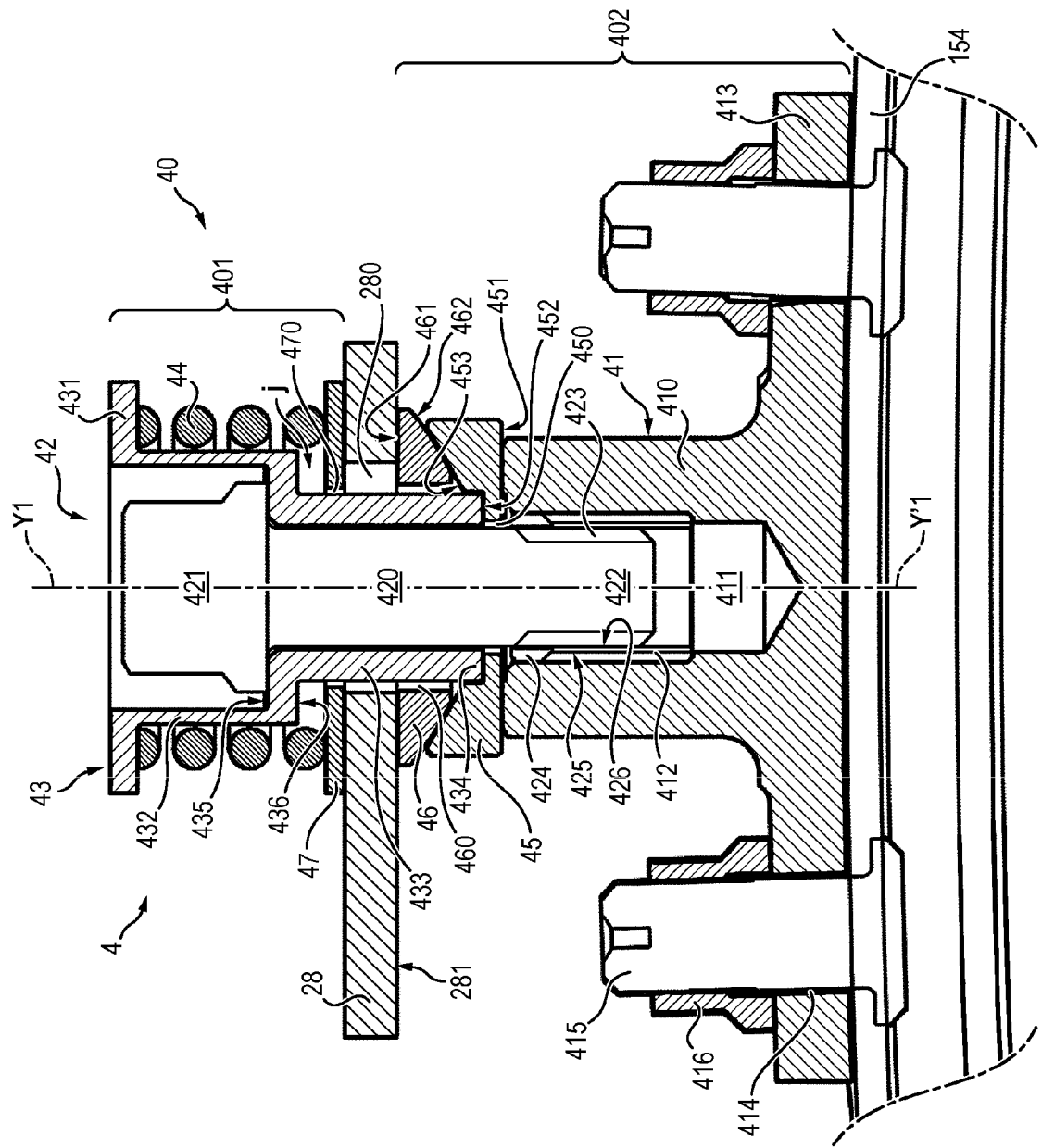
FIG. 6 is a transverse section view of the upstream retention device of FIG. 4.
Figure 7:
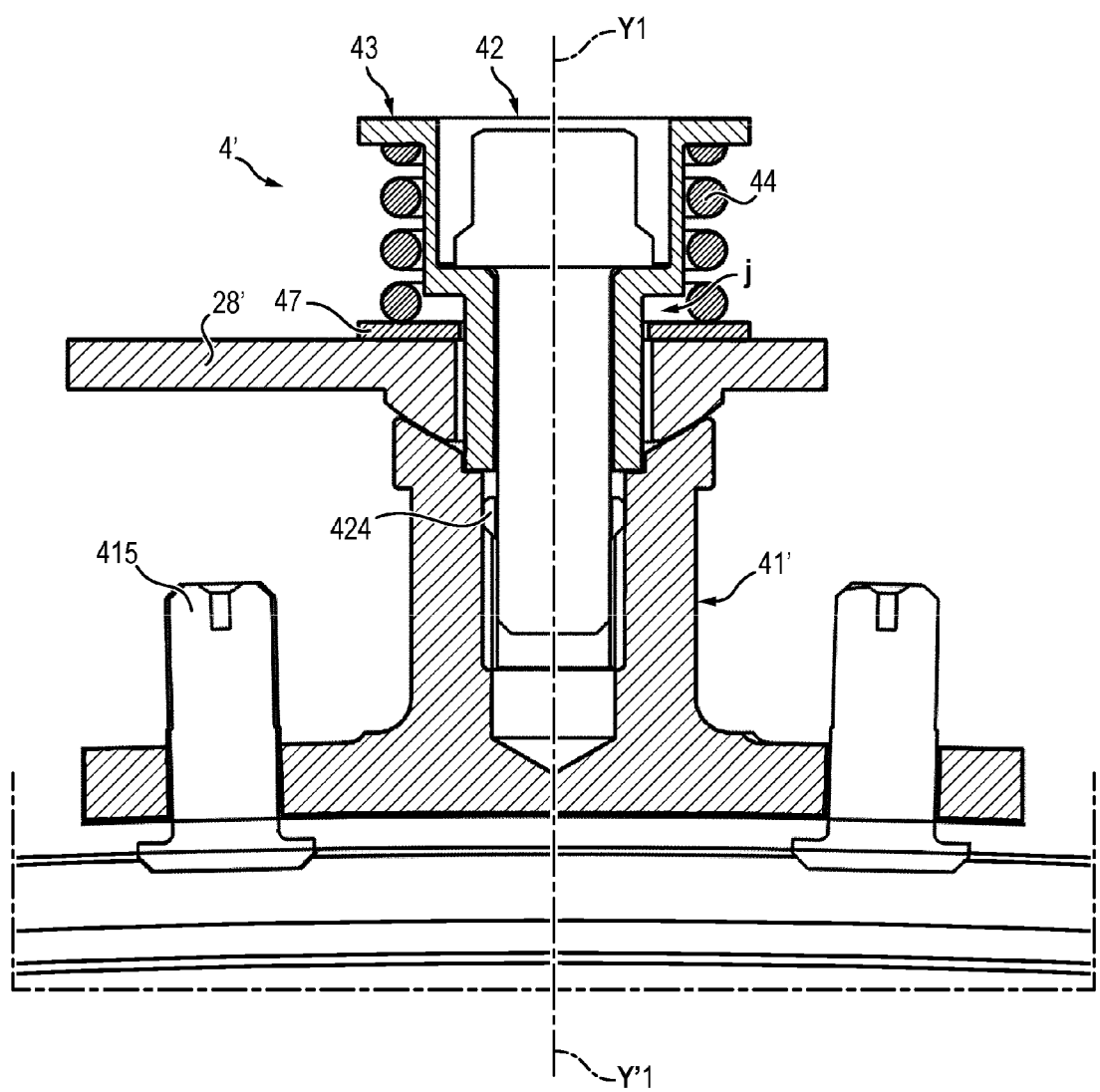
FIG. 7 is a transverse section view of a second embodiment of the upstream retention device of FIG. 4.

FIG. 7 illustrates a variant embodiment of the upstream retention device shown in FIG. 6. A device of this type bears the reference symbol 4'. This device differs from the preceding one in that the lateral flange 28 and the cupped washer 46 are a single piece and form a same single lateral flange with reference 28'.

Moreover, the boss differs from the previous one in that the cylindrical part 410 and the recessed washer 45 are a single piece, the boss then bearing the reference symbol 41'. The other parts are identical.

The operation of the upstream retention device 4 is the following.

The spring 44 is dimensioned so as to be loaded in compression and therefore constrained between the collar 431 and the lateral flange 28 or the washer 47 if it is present, when the screw 42 is screwed into the female blocking element 424. In other words, the elastic return member 44 is arranged and retained between the outer part 401 of the connection assembly 4 and the flange 28, so as to be loaded in compression.

This spring 44 therefore tends to constantly seek to return to its original position and therefore the separate the lateral flange 28 from the collar 431.

This original position is that shown in FIG. 6.

The spring 44 is configured so that the lateral flange 28 can approach the collar 431 by further compressing the turns of the spring 44, i.e. by working against the return force of said elastic return member.

Moreover, the collar 43 is configured so that in the original configuration shown in FIG. 6, when the socket 43 constrains the spring 44 due to the collar 431, there exists a clearance j between the shoulder 436 and the radially outer face of the washer 47 or the radially outer face of the lateral flange 28 if this washer 47 is absent.

When the lateral flange 28, secured to the housing 20, moves radially slightly outward (toward the top of FIG. 6) to follow the movement of the housing 20, then the washer 47 comes into abutment against the shoulder 436.

In this position, the spring 44 is then more strongly compressed. However, the clearance j is calculated to be sufficiently small and to prevent complete crushing, or even the deformation of the spring 44. The shoulder 436 therefore serves as an end-of-travel stop for the movement of the lateral flange 28. This allows permitting a radial but limited movement between the lateral flange 28 and the casing 154.

Moreover, the lateral flange 28 can move so that the central axis of its orifice 280 is no longer parallel with the axis Y1-Y'1.

A movement of this type is made possible by the cooperation of the cupped convex face 462 of the cupped washer 46 with the curved outer concave face 453 of the recessed washer 45. During this movement, the cupped washer 46 still rests against the recessed washer 45, but slides on it so that its axis is slightly offset relative to the axis Y-Y'1 of the screw 42. The cupped washer 46 thus follows the movement of the lateral flange 28. This sliding of the cupped washer 46 on the recessed washer 45 provides the function of the "ball-joint connection" of the upstream retention device 4.

In this case, the spring 44 is crushed more on one side than on the other.

Finally, it will be noted that the orifice 280 is oblong; it also allows movement of the flange 28 in a circumferential direction around the casing 154 (see arrows F1 in FIG. 5).

The downstream retention device 5 of the downstream end 26 of the housing 20 on the downstream flange 1540 of the casing will now be described in more detail while referring to FIGS. 7 to 9.

Figure 11:
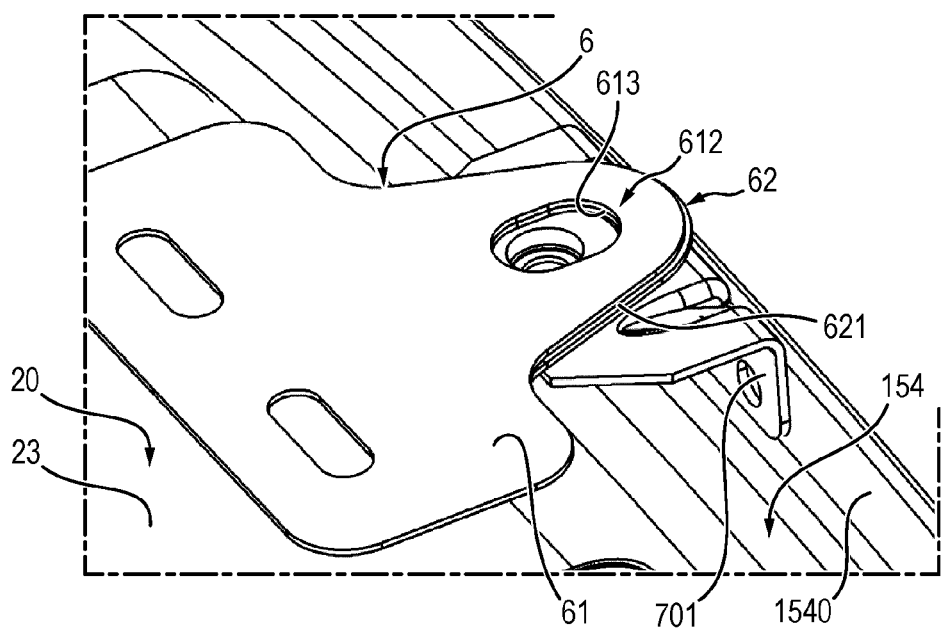
FIG. 11 is a detail perspective view of a part off the downstream retention device of FIGS. 8 to 10.

As can be seen in FIG. 11, the second retention device 5 comprises a retention element 6 (such as a downstream flange), attached to the air supply housing 20, and a connection assembly 7 connected to the downstream flange 1540 of the casing.

As can be seen in FIG. 11, the downstream flange 6 preferably has the form of an attachment tab which comprises for example a plate 61 and a plate 62 assembled together.

The plate 61 is attached on the housing on the housing 20, more precisely on its outer face 23.

The plate 61 also has a downstream part 612 which protrudes out of the housing 20 in the downstream direction and which is drilled with an orifice 613.

The plate 62 also comprises an upstream part which matches the shape of the downstream end 26 of the housing 20 and which is attached to it by screwing or by welding for example. This plate 62 is extended by a downstream part 621 which protrudes downstream relative to the housing 20 and which extends below the downstream part 612 of the plate 61, parallel to it. It is drilled with an orifice 622 (see FIG. 8).

The two orifices 613 and 622 are superimposed and coaxial.

Advantageously, they have an oblong shape, of which the larger dimension (length) is oriented in the axial direction x-x of the housing.

One possible embodiment of the connection assembly 7 will now be described with reference to FIG. 8. The connection assembly 7 extends on either side of the downstream flange 6 while defining, with reference to it, an outer part 701, i.e. located outside the element 6 (toward the top of FIG. 9), and an inner part 702, the latter extending between the downstream flange 6 and the outer surface of the casing 154, as can be seen in FIG. 9.

The connection assembly 7 generally comprises an attachment tab 71, a socket 72, an elastic return member 73, a connection pin 74, as well as a recessed washer 76 and a cupped washer 77, and preferably, to limit wear, two cylindrical washers 75, 78.

These various elements will now be described in more detail.

The connection pin 74 extends in a direction Y-Y', called "radial," due to its orientation relative to the downstream end of the casing 154.

The attachment tab 71 appears in the form of an L-shaped bracket, one 711 of the two branches of which is intended to be attached to the downstream flange 1540 of the casing 154. This attachment can be accomplished for example by screwing or by welding. When it is attached, this branch 711 extends in a plane parallel to the axis (direction) Y-Y'.

The second branch 712, perpendicular to the first 711, is drilled with an orifice 713.

The connection pin 74 is for example a screw comprising a body 740, equipped at one of its ends with a head 741, and which has at its opposite end 742 a thread 743. The screw 74 cooperates with a tapped nut 744, which can be screwed onto the thread 743. The free end 742 of the screw 74 and the nut 744 form part of the inner part 702 of the assembly 7.

The socket 72 has a generally cylindrical shape.

The socket 72 is bordered at one of its ends by a collar 721 which defines a first shoulder the role of which will be explained subsequently. This socket is extended inward from the collar 721 by a first part 722 with a large cross section, allowing the passage of the connection pin 74, including its head 741 and even possibly the passage of an installation or screwing tool for this head 741. This first part 722 is extended by a second part 723 with a narrow cross section, allowing the passage of the body 740 of the connection pin but prohibiting the passage of the head 741. The free end of the second part 723 bears the reference symbol 724.

The passage between the first part with a large cross section 722 and the second part with the narrow cross section 723 defines a second shoulder 725 on the inside of the central passage of the socket and a third shoulder 726 on the outside. The shoulder 725 retains the screw 74 head.

According to a variant embodiment not shown in the figures, the socket 72 and the connection pin 74 could form only a single piece.

The elastic return member 73 is for example a helical compression spring. It is arranged around the first part 722 of the socket 72, so that one of its ends is supported against the collar 721 and its other end is supported on the downstream flange 6. It is possible to interleave a cylindrical washer 75 drilled with a central orifice 750, between the downstream flange 6 and the helical spring 73, in order to prevent damage to the element 6. A washer 75 of this type is then arranged around the second part 723 of the socket 72.

Similarly, a cylindrical washer 78 drilled with an orifice 780 can be interleaved between the lower face of the branch 712 of the attachment tab 71 and the nut 744 in order to avoid damage to the nut 744 on the tab 712. The body 740 of the pin 74 passes through the orifice 750.

The recessed washer 76 is a cylindrical part with a small thickness drilled with a central orifice 760. It has a flat radially inner face 761 and an opposite radially outer face of which the central part 762 is flat and of which the peripheral part 763 is concave and curved from this flat part to the periphery of the washer.

This washer 76 is arranged so that its flat inner face 761 is in contact with the branch 712 of the attachment tab 71 and the free end 724 of the socket 72 rests against its central flat face 762.

The cupped washer 77 is drilled with a central orifice 770 of larger dimensions than the orifice 760. It has a flat outer face 771 and an opposite convex and cupped inner face 772.

The cupped washer 77 is arranged around the part with the narrow cross section 723 of the socket 72, so that its flat outer face 771 is in contact with the downstream flange 6 and its convex inner face 772 is in contact with the concave outer face 763 of the washer 76.

The assembly of the second retention device 5 is as follows.

The socket 72, the return member 73 and the different washers 75, 76, 77 and 78 are positioned as previously disclosed. The screw 74 is introduced into the socket 72 as well as through the orifices 760, 713 and 780. The narrow part 723 of the socket is inserted into the orifices 613, 622, 750 and 770. The nut 744 is screwed to the threaded end 743 of the screw and below the branch 712 of the tab 71.

This screwing is performed so that the nut 744 comes into abutment against the washer 78 and the second part 723 of the socket 72, the washer 76 and the branch 712 are retained and immobilized between the head 741 of the screw 74 and the nut 744.

The operation of the second retention device 5 is the following.

The spring 73 is dimensioned so as to be loaded in compression and therefore constrained between the collar 721 and the element 6 or the washer 75 if it is present.

In other words, the elastic return member 73 is arranged and retained between the outer part 701 of the connection assembly 7 and the downstream flange 6 so as to be loaded in compression.

This spring 73 tends to permanently seek to return to its original position, and therefore to separate said downstream flange 6 from the collar 721, (i.e. from the outer part of the connection assembly).

Figure 8:
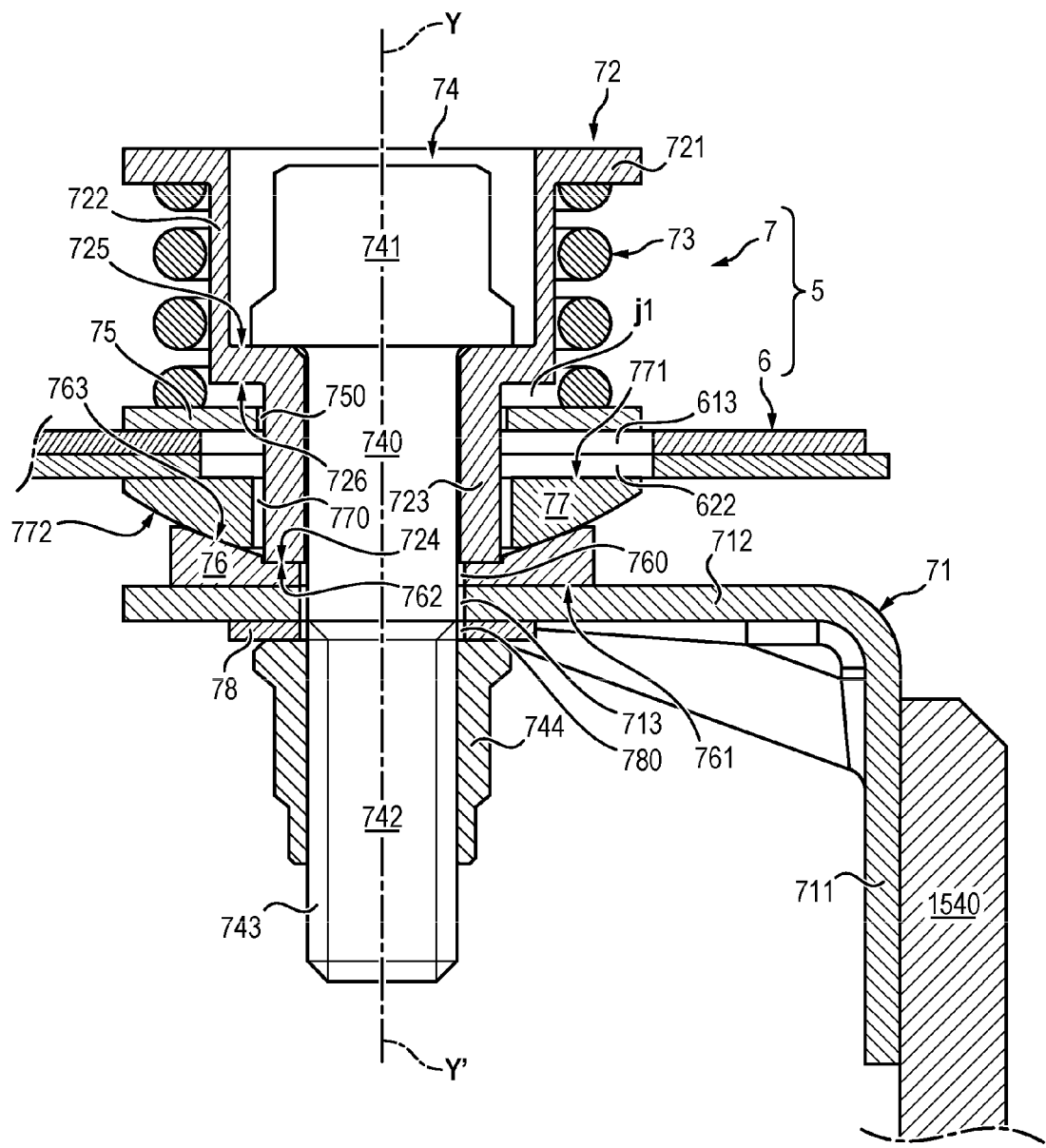
FIG. 8 is a section view of the downstream retention device which forms a part of the attachment device according to the invention, this downstream retention device being shown in a first position.

This original position is shown in FIG. 8.

However, the elastic return member (spring) 73 is configured so that the downstream flange 6 can approach the outer part 701 of the connection assembly 7 (particularly the collar 721) by further compressing the turns of the spring, i.e. by working against the return force of said elastic return member.

Figure 9:
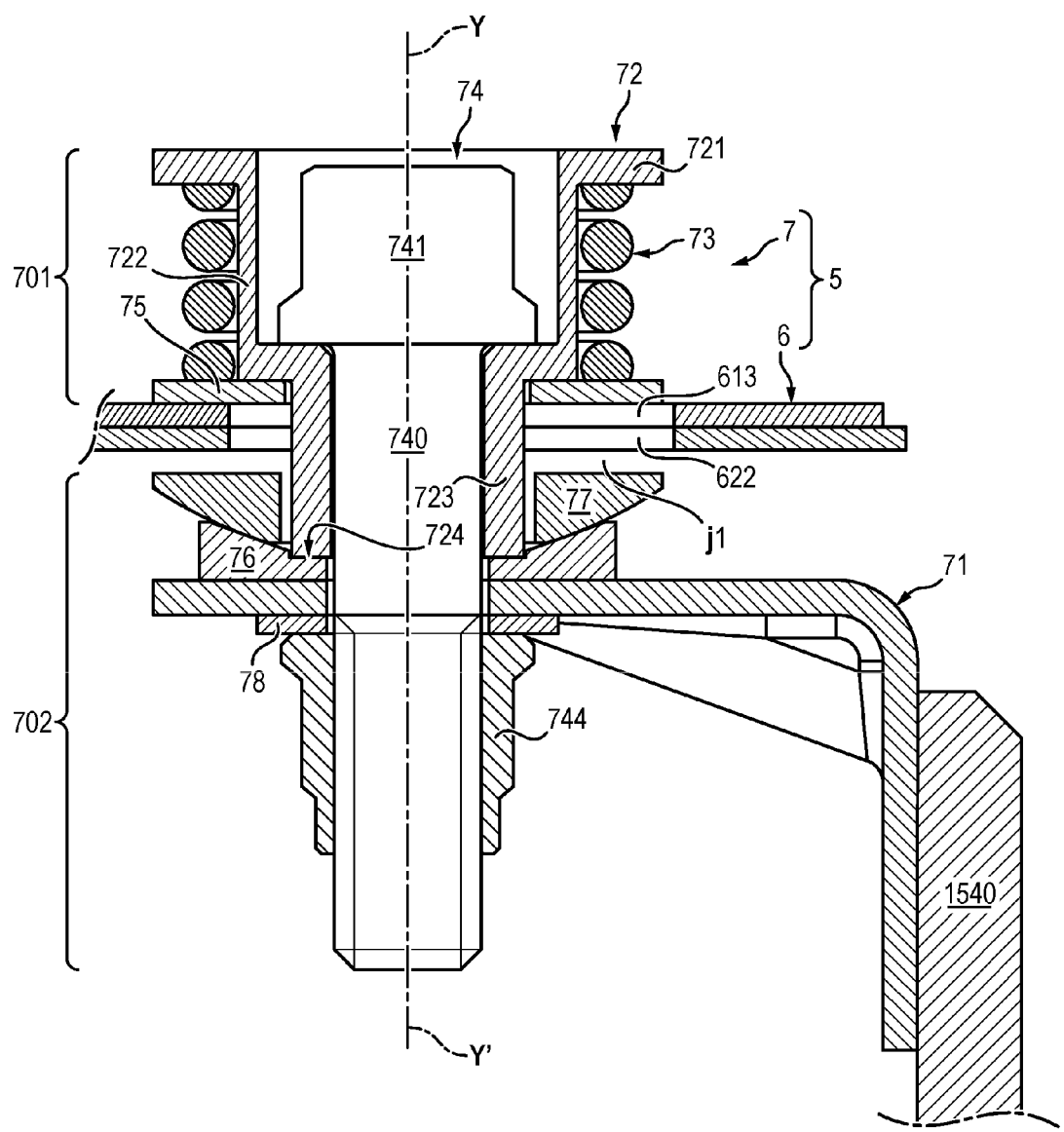
FIG. 9 is a section view of the downstream retention device which forms a part of the attachment device according to the invention, this downstream device being shown in a second position.

This other position is shown in FIG. 9.

Advantageously, moreover, the different elements of the connection assembly 7 and of the downstream flange 6 are configured so that in the original configuration shown in FIG. 8, when the socket 72 constrains the spring 73 due to the collar 721, there exists a clearance j1 between the shoulder 726 and the upper face of the washer 75 or the upper face of the downstream flange 6 if the washer 75 is absent.

In the second position, shown in FIG. 9, the downstream flange 6, secured to the housing 20, has moved slightly outward (toward the top of the figure) to follow a movement of this housing 20. In doing so, the washer 75 comes into abutment against the shoulder 726. The clearance j1 then extends between the outer face 771 of the cupped washer 77 and the inner face of the downstream flange 6. In this second position, the spring 73 is more strongly compressed. However, the clearance j1 is calculated to be sufficiently small to prevent complete crushing, or even the deformation of the spring 73. The shoulder 726 serves therefore as an end-of-travel stop for the movement of the downstream flange 6.

It is therefore understood that this device according to the invention allows permitting (radial) movement between the downstream flange 6 secured to the housing 20 and the flange 1540 of the casing, in other words movement between the housing 20 and the casing 154. This movement is exerted in a first direction corresponding to the axis Y-Y'. In addition, the oblong shape of the orifices 613, 622 of the downstream flange 6 allows movement of this flange in the axial direction X-X', around the narrow part 723 of the socket 72.

Figure 10:
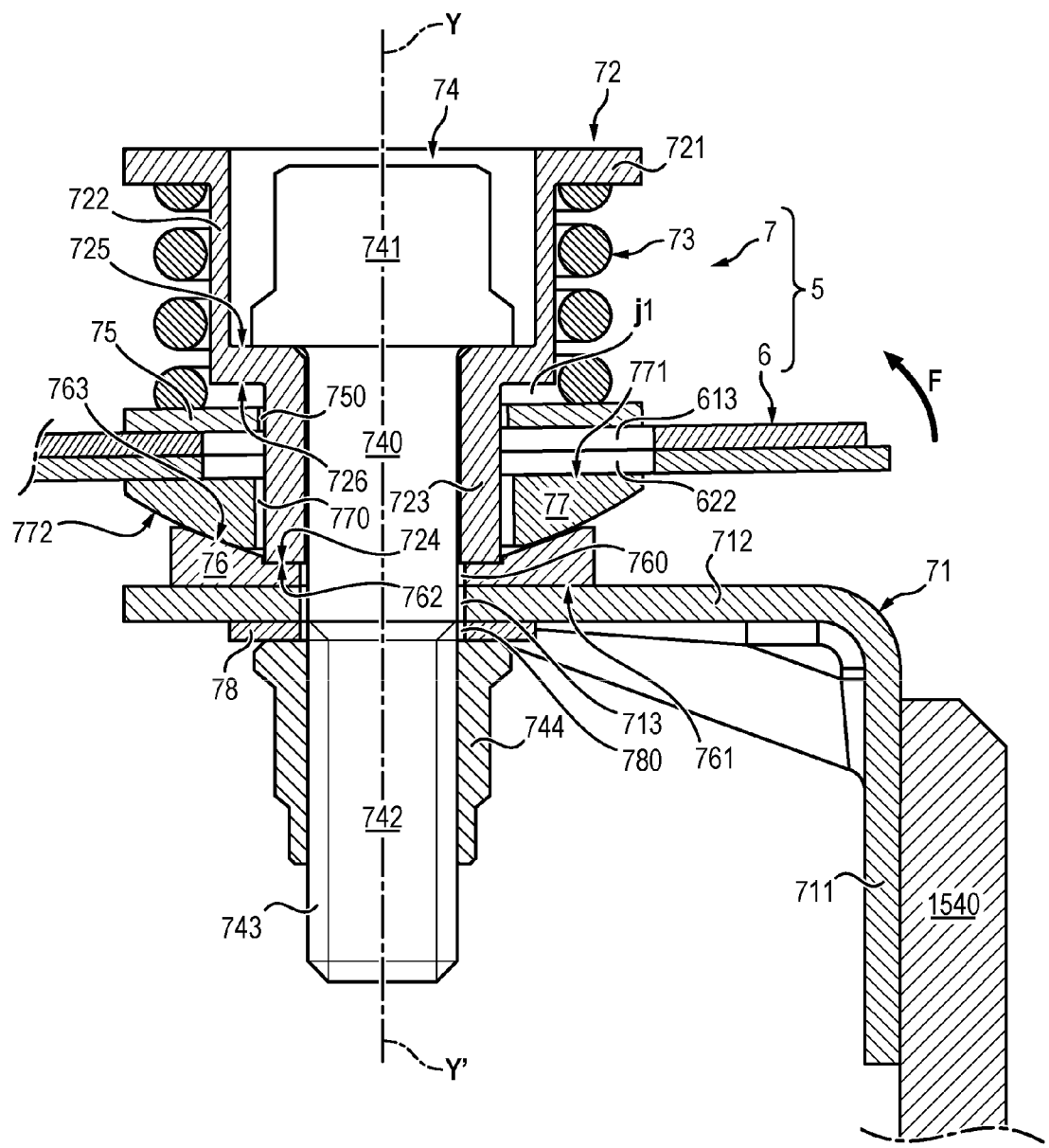
FIG. 10 is a section view of the downstream retention device which forms a part of the attachment device according to the invention, this downstream device being shown in a third position.

Finally, the downstream flange 6 can move jointly in the axial direction and in the radial direction (see arrow F in FIG. 10).

In this position, the downstream flange 6 is no longer perpendicular to the axis Y-Y' of the screw 74, (or in other words, it is no longer parallel to the branch 712 of the attachment tab 71).

This movement is made possible by the cooperation of the convex face 772 of the cupped washer 77 with the concave outer face 763 of the recessed washer 76. In this position, the cupped washer 77 still rests against the recessed washer 76, but slides on it so that its axis is slightly offset relative to the axis Y-Y' of the screw 74. The cupped washer 77 thus follows the movement of the downstream flange 6. This sliding of the washer 77 on the washer 76 provides the function of "ball-joint connection" of the device 5.

The spring 73 is further crushed between the collar 721 and the free end of the downstream flange 6 (to the right in FIG. 10) than between the collar 721 and the part of the downstream flange 6 closest to the housing 20 (to the left in FIG. 10).

The downstream flange 6 is therefore always held under pressure by the spring 73 but can thus move relative to the casing 154 and follow its deformation.

The invention claimed is:

1. A device for cooling, using air jets, an outer casing of a turbomachine, the cooling device comprising a housing for supplying air to cooling tubes of the outer casing, said housing comprising an upstream end and a downstream end, upstream and downstream being defined relative to the flow direction of the flow in said turbomachine, wherein said housing comprises an attachment device on said outer casing, wherein the attachment device comprises two upstream retention devices using ball joint connection, configured to connect the upstream end of the housing to an outer face of the outer casing while allowing movement of the upstream end relative to the outer face of the outer casing, wherein each of the upstream retention devices comprises a cupped washer and a recessed washer, the cupped washer comprising a cupped face received in a concave face of the recessed washer, the cupped washer being able to move relative to the recessed washer to form the ball-joint connection and wherein at least one of the two upstream retention devices comprises a lateral flange attached to the housing and a connection assembly attached to the outer casing, the connection assembly comprises a connecting screw attached to a boss and a hollow cylindrical socket, the hollow cylindrical socket having a part with a large cross section for receiving a head of the connecting screw, the part with the large cross section having, at an outer end, a first shoulder forming a stop for an elastic return member in a radial direction of the cooling device and the part with the large cross section being extended at an inner end of the part with the large cross section by a part with a narrow cross section for receiving a body of the screw, wherein the part with the narrow cross section of the socket is housed both in an opening of the lateral flange attached to the housing and in a central orifice provided in the cupped washer of the at least one of the two upstream retention devices.

2. The cooling device using air jets according to claim 1, wherein said recessed washer includes a central orifice and has a flat radially inner face and an opposite radially outer face of which a central part is flat and of which a peripheral part is concave, and wherein the recess washer is arranged so that the radially inner face of the recessed washer rests against a flat face of the boss and that a free end of the part with the narrow cross section of the socket rests against the flat central part of the radially outer face of the recessed washer.

3. The cooling device using air jets according to claim 1, wherein the lateral flange and the cupped washer of each of the upstream devices are in a single piece and wherein the boss and the recessed washer are in a single piece.

4. The cooling device using air jets according to claim 1, wherein each of the upstream devices comprises a cylindrical washer including an orifice and arranged around the connection assembly, against the lateral flange attached to the housing, via the elastic return member supported on the first shoulder.

5. The cooling device using air jets according to claim 1, wherein said hollow cylindrical socket has, on an external surface of the hollow cylindrical socket, a third shoulder between the part with the narrow cross section and the part with the large cross section and wherein the third shoulder forms a stop for limiting a travel of the lateral flange of the housing relative to the outer casing.

6. The cooling device using air jets according to claim 1, wherein the opening provided in the lateral flange of the housing has an oblong shape a largest dimension of the opening being oriented circumferentially around a longitudinal axis of the casing.

7. The cooling device using air jets according to claim 1, wherein the attachment device comprises a downstream retention device using a ball joint connection, which is configured to connect the downstream end of the housing to the outer casing while allowing movement of the downstream end of the housing relative to the outer casing.

8. The cooling device using air jets according to claim 7, wherein the downstream retention device comprises a cupped washer and a recessed washer, the cupped washer of the downstream retention device comprising a cupped face received in a concave face of the recessed washer of the downstream retention device, said cupped washer of the downstream retention device being able to move relative to said recessed washer of the downstream retention device to form the ball-joint connection.

9. The cooling device using air jets according to claim 8, wherein the downstream retention device comprises a downstream flange attached to the housing and a connection assembly attached to the outer casing and extending through an opening provided in the downstream flange of the downstream retention device, wherein the connection assembly of the downstream retention device comprises a connecting screw and a hollow cylindrical socket, the hollow cylindrical socket of the connection assembly of the downstream retention device having a part with a large cross section for receiving a head of the connecting screw of the connection assembly of the downstream retention device, the part with the large cross section of the hollow cylindrical socket of the connection assembly of the downstream retention device having at an outer end a first shoulder, forming a stop for an elastic return member in a radial direction of the cooling device and the part with the large cross section being extended at an inner end by a part with a narrow cross section (723) for receiving a body of the connecting screw of the connection assembly of the downstream retention device, wherein the part with the narrow cross section of the hollow cylindrical socket of the connection assembly of the downstream retention device is housed both in an opening of the downstream flange) of the housing and in a central orifice of the cupped washer of the downstream retention device and wherein a female blocking element is configured to be screwed into an inner end of the connecting screw of the connection assembly of the downstream retention device, against an attachment tab attached to the casing.

10. The cooling device using air jets according to claim 9, wherein the socket of the connection assembly of the downstream retention device has on an external surface a third shoulder between the part with the narrow cross section and the part with the large cross section of the socket of the connection assembly of the downstream retention device and wherein the third shoulder forms a stop for limiting the travel of the downstream flange of the housing relative to the attachment tab attached to said casing.

11. The cooling device using air jets according to claim 9, wherein the opening provided in the downstream flange of the downstream retention device has an oblong shape, the largest dimension of the opening provided in the downstream flange of the downstream retention device being oriented along the longitudinal axis of the casing.

12. A turbomachine, comprising the outer casing and the cooling device using air jets according to claim 1, the cooling tubes including air ejection holes and being arranged around the outer face of said outer casing so that the air ejection holes face the outer face of said outer casing.

* * * * *